United States Patent
Hewett et al.

(10) Patent No.: US 10,948,999 B2
(45) Date of Patent: Mar. 16, 2021

(54) METAL AND PLASTIC COMPOSITE KEYBOARD

(71) Applicant: Microsoft Technology Licensing, LLC, Redmond, WA (US)

(72) Inventors: Anthony James Hewett, Duvall, WA (US); Minh Cao Nguyen, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 200 days.

(21) Appl. No.: 15/479,052

(22) Filed: Apr. 4, 2017

(65) Prior Publication Data

US 2018/0284905 A1    Oct. 4, 2018

(51) Int. Cl.
*G06F 1/16* (2006.01)
*G06F 3/02* (2006.01)
*G06F 3/0354* (2013.01)

(52) U.S. Cl.
CPC .......... *G06F 3/0213* (2013.01); *G06F 1/1662* (2013.01); *G06F 1/1681* (2013.01); *G06F 1/1698* (2013.01); *G06F 3/03547* (2013.01)

(58) Field of Classification Search
CPC ........ G06F 3/0213; G06F 1/1662; G06F 1/16; G06F 1/1681; G06F 1/1698; G06F 3/03547
See application file for complete search history.

(56) References Cited

U.S. PATENT DOCUMENTS

| | | | |
|---|---|---|---|
| 5,443,320 A * | 8/1995 | Agata | B41J 3/36 248/118.1 |
| 6,336,614 B1 | 1/2002 | Kwitek | |
| 6,903,924 B1 | 6/2005 | Tyner | |
| 6,963,486 B2 | 11/2005 | Kwitek | |
| 8,213,170 B2 | 7/2012 | Abe | |
| 8,687,359 B2 | 4/2014 | Theobald et al. | |
| 8,811,003 B1 * | 8/2014 | Hayashida | G06F 1/1662 361/679.08 |
| 8,884,172 B2 | 11/2014 | Lee et al. | |
| 8,897,002 B2 | 11/2014 | Degner et al. | |
| 9,507,385 B2 * | 11/2016 | Chen | G06F 1/1669 |
| 9,510,492 B2 | 11/2016 | Liu et al. | |
| 9,535,462 B2 | 1/2017 | Watabe et al. | |

(Continued)

OTHER PUBLICATIONS

Mike, ""CM Storm Mech Keyboard Review"", http://www.pcgameware.co.uk/reviews/keyboards/cm-storm-mech-gaming-keyboard/, Published on: Nov. 11, 2013, 7 pages.

(Continued)

*Primary Examiner* — Matthew G Marini
*Assistant Examiner* — Marissa Ferguson-Samreth
(74) *Attorney, Agent, or Firm* — Holzer Patel Drennan

(57) ABSTRACT

The metal and plastic composite keyboards disclosed herein each include a two-part top bezel, which in turn includes a metallic first top bezel and a plastic second top bezel. The metallic first top bezel and a plastic second top bezel are attached to one another at respective overlapping regions and the two-part top bezel is attached to a bottom bezel to form a metal and plastic composite keyboard. The plastic second top bezel may include an electromagnetic window that reduces or eliminates interference on one or more antennas within a hingedly connected display, when the display is pivoted against the keyboard.

20 Claims, 5 Drawing Sheets

(56) References Cited

U.S. PATENT DOCUMENTS

| | | | |
|---|---|---|---|
| 2004/0234319 A1 | 11/2004 | Lee | |
| 2008/0284663 A1* | 11/2008 | Arima | G06F 1/1616 |
| | | | 343/702 |
| 2009/0179537 A1 | 7/2009 | Morino et al. | |
| 2012/0162890 A1* | 6/2012 | Chuang | G06F 1/1616 |
| | | | 361/679.09 |
| 2016/0049266 A1* | 2/2016 | Stringer | H01H 13/704 |
| | | | 200/5 A |
| 2017/0052611 A1* | 2/2017 | Komatsu | G06F 3/03547 |
| 2018/0314301 A1* | 11/2018 | Evans | G06F 1/1662 |
| 2019/0041903 A1* | 2/2019 | Shah | G06F 1/169 |

OTHER PUBLICATIONS

"Lenovo ThinkPad X1 Helix Keyboard Bezel Cover Palmrest Upper Case W/ Metal Frame Refurbished", https://www.aliexpress.com/store/product/NEW-ORIGINAL-LENOVO-THINKPAD-X1-HELIX-SERIES-keyboard-bezel-cover-palmrest/1093162_32245355497.html, Reprieved on: Jan. 17, 2017, 2 pages.

\* cited by examiner

METAL AND PLASTIC COMPOSITE KEYBOARD

BACKGROUND

A computer keyboard or blade is a typewriter-style device having an arrangement of keys representing symbols or functions. The individual keys act as mechanical levers and electronic switches that convert physical operation of the keys into electronic signals that may be interpreted by a computing device to signify a user's selection of a symbol or function. As computing devices shrink in physical size and weight and become more portable, keyboards associated with the computing devices also shrink in physical size and weight. However, user expectations demand that keypad layout and size, as well as keypad performance, remain substantially the same or be improved.

Further, to effectively operate on surfaces that may not be entirely flat or rigid and reduce the likelihood of physically deflecting and damaging the keyboard, many keyboards incorporate a minimum stiffness specification to resist various bending loads. Maintaining the minimum stiffness specification becomes increasingly difficult as keyboard physical size (including thickness) and weight is reduced. Still further, the computing devices may include one or more antenna, whose performance may be affected by material construction of an adjacent keyboard.

SUMMARY

Implementations described and claimed herein provide a keyboard including a keypad, a touchpad, a bottom bezel, a metallic first top bezel, and a plastic second top bezel. The bottom bezel provides structural support for the keypad and the touchpad and spans a bottom side of the keyboard. The metallic first top bezel includes webbing separating individual keys of the keypad and spans substantially an entire width of the bottom bezel in a keypad area of the keyboard. The plastic second top bezel forms a palm rest of the keyboard and spans substantially an entire width of the bottom bezel in a touchpad area of the keyboard.

Implementations described and claimed herein further provide a method of manufacturing a metal and plastic composite keyboard. The method includes forming a metallic first top bezel with webbing separating individual keys of a keypad and spanning substantially an entire width of the bottom bezel in a keypad area of the keyboard, forming a plastic second top bezel forming a palm rest of the keyboard and spanning substantially an entire width of the bottom bezel in a touchpad area of the keyboard, attaching the metallic first top bezel to the plastic second top bezel to form a two-part top bezel, and attaching the two-part top bezel to a bottom bezel, the bottom bezel providing structural support for the keypad and a touchpad and spanning a bottom side of the keyboard.

Implementations described and claimed herein still further provide a computing device including a first hinged portion with an antenna at an end of the computing device opposite a hinge and a second hinged portion including a keyboard. The keyboard includes a keypad, a touchpad, a bottom bezel, a metallic first top bezel, and a plastic second top bezel. The bottom bezel provides structural support for the keypad and the touchpad and spans a bottom side of the keyboard. The metallic first top bezel includes webbing separating individual keys of the keypad and spans substantially an entire width of the bottom bezel in a keypad area of the keyboard. The plastic second top bezel forms a palm rest of the keyboard and spans substantially an entire width of the bottom bezel in a touchpad area of the keyboard. The plastic second top bezel rests adjacent the antenna of the first hinged portion when the second hinged portion is pivoted against the first hinged portion.

Other implementations are also described and recited herein. This Summary is provided to introduce a selection of concepts in a simplified form that are further described below in the Detailed Descriptions. This Summary is not intended to identify key features or essential features of the claimed subject matter, nor is it intended to be used to limit the scope of the claimed subject matter.

BRIEF DESCRIPTIONS OF THE DRAWINGS

DETAILED DESCRIPTIONS

The metal and plastic composite keyboards described herein may reduce physical size and weight of a keyboard, while maintaining keypad layout and size and meeting an acceptable minimum stiffness specification, as compared to conventional keyboard designs. The metal and plastic composite keyboards may have a tailored construction to reduce electromagnetic interference with one or more antennas included within an associated computing device. The metal and plastic composite keyboards are intended to address some or all of the foregoing problems, as well as additional problems not specifically identified herein.

Figure 1:
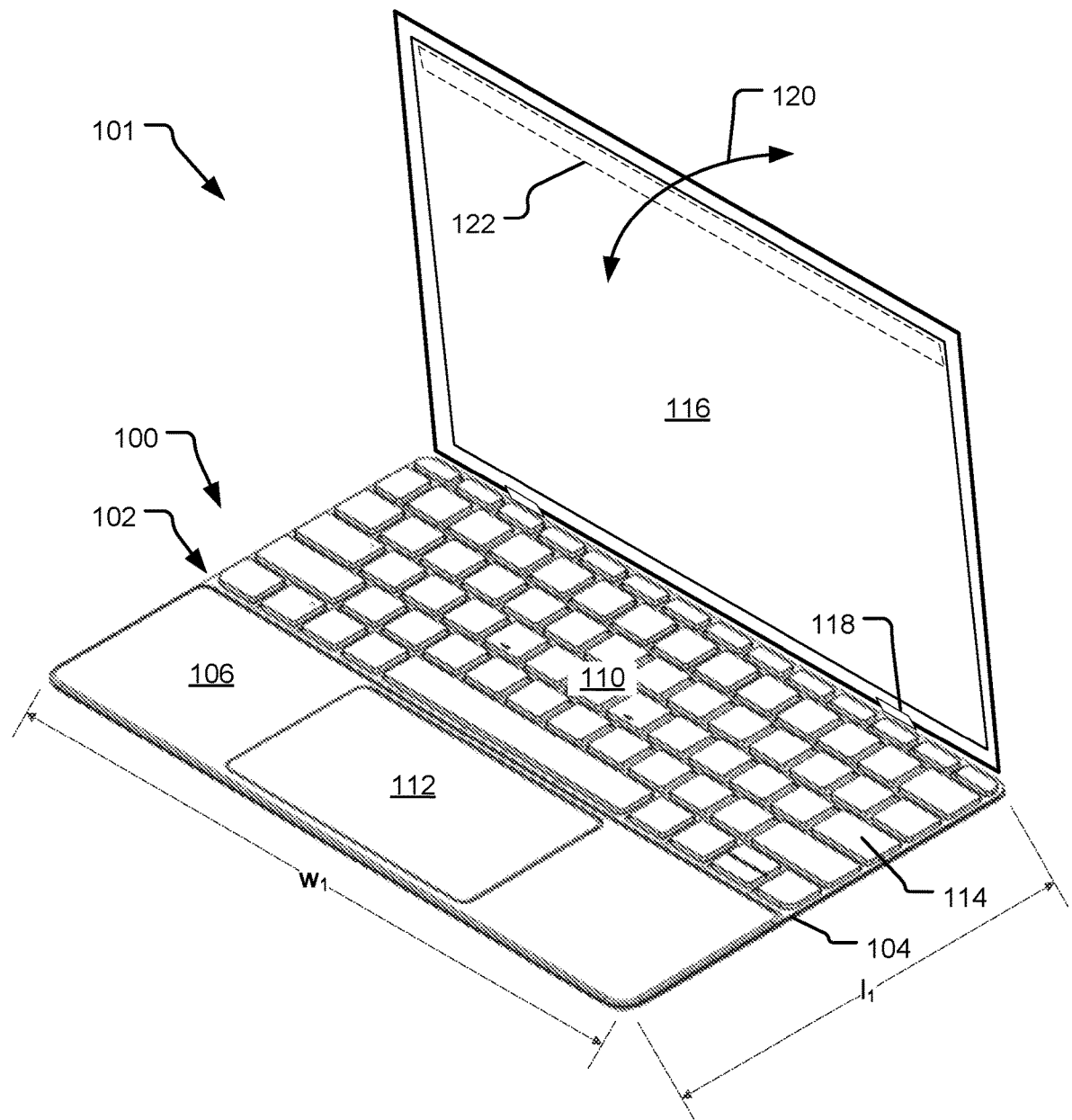
FIG. 1 illustrates a perspective view of an example computing device including a metal and plastic composite keyboard.

FIG. 1 illustrates a perspective view of an example computing device 101 including a display 116 hingedly connected to a metal and plastic composite keyboard 100. The display 116 (also referred to herein as a first hinged portion) may include a touchscreen or other display screen, as well as computing, power, electronic storage, or other electronic components. One or more hinges (e.g., hinge 118) physically and communicatively attach the keyboard 100 (also referred to herein as a second hinged portion) to the display 116, while permitting the display 116 to be pivoted about a fixed axis with respect to the keyboard 100. In various implementations, the display 116 includes one or more antenna 122 extending along an edge of the display 116 opposite the hinges.

In various implementations, the computing device is a tablet computer, laptop computer, personal computer, gaming device, smart phone, or any other discrete device that carries out one or more specific sets of arithmetic and/or logical operations. The hinges may take a variety of physical forms, including various sizes and shapes. In some instances, the display 116 is removable from the keyboard 100. In other implementations, the hinges are omitted and the keyboard 100 is otherwise physically attached to the display 116 or not physically attached to the display 116 at all.

The keyboard 100 may be powered by and/or communicate with the display 116 or other aspects of the computing device 101 via contacts in the hinges or communicate wirelessly over a variety of available communication standards (e.g., Bluetooth, infrared, near field communication, ultraband, and ZigBee). In various implementations, the keyboard 100 may have its own power supply (e.g., one or more batteries, not shown), be powered from the display 116 via the hinges, or be powered wirelessly from the display 116 or another power source.

The keyboard 100 includes a two-part top bezel 102, which is combined with a bottom bezel or backer (not shown, see e.g., bottom bezel 308 of FIG. 3) to form a structure for securing a keypad 110 and a touchpad 112 within the keyboard 100. As shown, the two-part top bezel 102 spans substantially an entire length and width of the bottom bezel, thus substantially an entire length $l_1$ and width $w_1$ of the keyboard 100. In various implementations, length $l_1$ may vary between 175 mm and 205 mm and width $w_1$ may vary between 245 mm and 300 mm.

The keypad 110 contains an array of keys (e.g., key 114) arranged in a predetermined pattern (e.g., QWERTY) on and attached to a top side of the bottom bezel. Each key within the keypad 110 may be communicatively connected to a flexible flat cable (not shown) that provides connectivity to the overall computing device 101. In various implementations, the keys within the keypad 110 may also be connected via integrated membranes printed with electrical traces or the keypad 110 may implement optics or magnetics to detect actuation of individual keys. The touchpad 112 (alternatively a trackpad or mousepad) converts physical user inputs into corresponding electrical signals that may be interpreted by the computing device 101. In further implementations, the top bezel 102 and the bottom bezel may secure additional electronic components or other user interface components (e.g., dials, knobs, lights, displays, and sensors) within the keyboard 100.

The two-part top bezel 102 includes a metallic first top bezel 104 and a plastic second top bezel 106. The metallic bezel 104 is made of a generally stiffer and heavier material than the plastic bezel 106. However, the metallic bezel 104 has a potential to create electromagnetic interference (e.g., RF interference). In various implementations, the metallic bezel 104 is made of a metal alloy of aluminum, copper, chromium, iron, magnesium, nickel, titanium, and/or zinc (e.g., stainless steel), for example.

The metallic bezel 104 is used in areas of the keyboard 100 where there is little overall available top surface area for the metallic bezel 104. For example, the metallic bezel 104 is a grid (or webbing) that surrounds the keypad 110 and individual keys of the keypad 110 where the keypad 110 consumes much of the available top surface area of the keyboard 100. In various implementations, the keypad 110 may occupy 150 cm² to 250 cm², while the metallic bezel 104 may occupy 35 cm²-65 cm² of the available top surface area of the keyboard 100 (excluding portions of the top bezel 104 that may overlap with the plastic bezel 106. The metallic bezel 104 also spans substantially an entire width of the bottom bezel.

As the display 116 is pivoted and closed against the keyboard 100, as illustrated by arrow 120, the antenna 122 (shown in dashed lines as the antenna 122 is hidden within the display 116) may come in close physical proximity to the keyboard 100. As the metallic bezel 104 has a potential to create electromagnetic interference when placed in close proximity to the antenna 122, the metallic bezel 104 is kept within a physical location on the keyboard 100 away from the antenna 122 in all angular orientations of the display 116 with respect to the keyboard 100. For example, the metallic bezel 104 is kept outside one or more predefined zones that are reserved from antenna 122 operation in all orientations of the display 116 with respect to the keyboard 100 (e.g., a closed orientation with the keypad 110 facing the display 116, a closed orientation with both the keypad 110 and the display 116 facing away from the computing device 101, a closed orientation with the display 116 rotated and one of the keypad 110 and the display 116 facing away from the computing device 101, and any open angular orientation). For example, such zones keep the metallic bezel 104 more than 10 mm away from the antenna 122.

The plastic bezel 106 is made of a generally lighter and more flexible material than the metallic bezel 104. In contrast to the metallic bezel 104, the plastic bezel 106 has little to no potential to create electromagnetic interference. In various implementations, the plastic second top bezel 106 is made of a wholly plastic or plastic composite material such as a polyethylene, polyvinyl chloride (PVC), acrylonitrile butadiene styrene (ABS), polycarbonate (PC), PC/ABS, glass-filled polycarbonate, carbon fiber reinforced polymer (CFRP), and other fiber reinforced polymers. Some of the aforementioned materials may perform better than others with regard to the absence of electromagnetic interference.

The plastic bezel 106 is used in areas of the keyboard 100 where there is greater available top surface area for the plastic bezel 106. For example, the plastic bezel 106 forms a palm rest portion of the keyboard 100 and surrounds the touchpad 112. In other implementations, the touchpad 112 is a membrane that overlays the plastic bezel 106 and palm rest portion of the keyboard 100 rather than fitting within an aperture in the plastic bezel 106. The plastic bezel 106 spans substantially an entire width of the bottom bezel. As there is greater available top surface area in the touchpad area of the keyboard 100 as compared to the keypad area, a greater quantity of plastic material may be used to form the plastic bezel 106 as compared to the metallic bezel 104. However, due to the lighter and more flexible nature of the plastic material, the plastic bezel 106 may achieve similar rigidity as the top bezel 104.

As the display 116 is closed against the keyboard 100, as illustrated by arrow 120, the antenna 122 comes in close physical proximity to plastic bezel 106 of the keyboard 100. However, since the plastic bezel 106 has little to no potential to create electromagnetic interference, this close proximity does not substantially hinder performance of the antenna 122. This is also referred to herein as providing an electromagnetic window for the associated computing device.

The keyboard 100 may be covered by a fabric covering (not shown) that serves to further seal the interior of the keyboard 100 from contaminates and hides seams between the various components of the keyboard 100. In some implementations, two sheets of fabric are oriented on each side of the keyboard 100 and are laminated together to form the fabric covering. The fabric covering may include one or more windows that expose the keypad 110 and the touchpad 112 to the user. The fabric covering may also integrate a touch-sensing capability that can digitize a user's physical interaction with the fabric covering, thus functions of the keypad 110 and/or touchpad 112 may pass through the fabric covering. The fabric covering may further offer a desirable tactile experience for the user. In other implementations, the fabric covering is omitted. The fabric covering may be approximately 0.5 mm thick.

Figure 2:
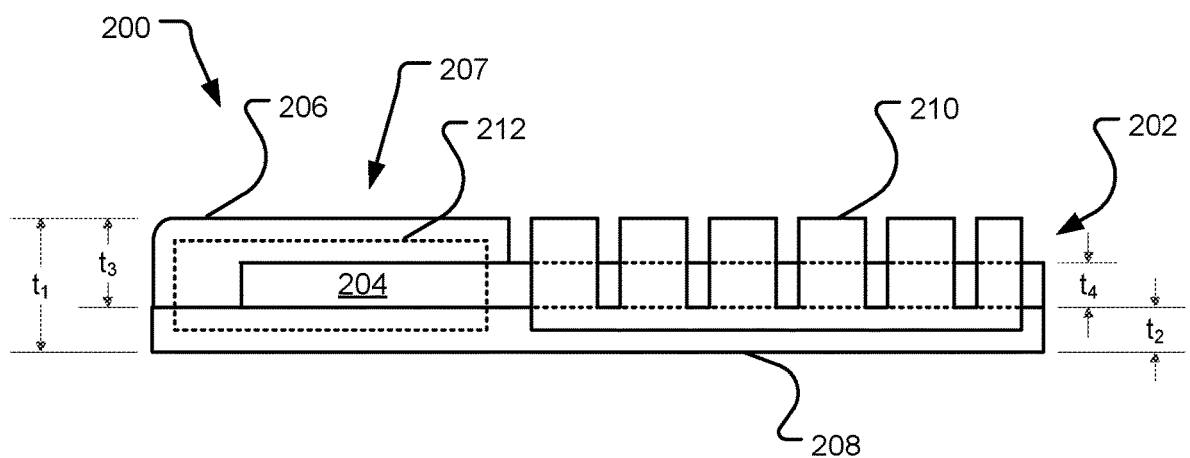
FIG. 2 illustrates an elevation side sectional view of an example metal and plastic composite keyboard.

FIG. 2 illustrates an elevation side sectional view of an example metal and plastic composite keyboard 200. The keyboard 200 includes a two-part top bezel 202, which is combined with a bottom bezel or backer 208 to form a structure for securing a keypad 210 and a touchpad 212 (each of which shown in dotted lines as they may be hidden from view) within the keyboard 200. In further implementations, the top bezel 202 and the bottom bezel 208 may secure additional electronic components within the keyboard 200.

The two-part top bezel 202 includes a metallic first top bezel 204 and a plastic second top bezel 206. The metallic bezel 204 is made of a generally stiffer and heavier material than the plastic bezel 206. However, the metallic bezel 204 has a potential to create electromagnetic interference. The metallic bezel 204 is used in areas of the keyboard 200 where there is little overall available top surface area. For example, the metallic bezel 204 is a grid or webbing that surrounds the keypad 210 and individual keys of the keypad 210 where the keypad 210 consumes much of the available top surface area of the keyboard 200. Further, as the metallic bezel 204 has a potential to create electromagnetic interference when placed in close proximity to an antenna (not shown, see e.g., antenna 122 of FIG. 1), the metallic bezel 204 is kept within a physical location on the keyboard 200 away from any antennas included within an associated computing device (not shown, see e.g., computing device 101 of FIG. 1).

The plastic bezel 206 is made of a generally lighter and more flexible material than the metallic bezel 204. In contrast to the metallic bezel 204, the plastic bezel 206 has little to no potential to create electromagnetic interference. The plastic bezel 206 is used in areas of the keyboard 200 where there is greater available top surface area for the plastic bezel 206. For example, the plastic bezel 206 forms a palm rest portion of the keyboard 200 and surrounds the touchpad 212. As there is greater available top surface area in the touchpad area of the keyboard 200 as compared to the keypad area, a greater quantity of plastic material may be used to form the plastic bezel 206 as compared to the metallic bezel 204. However, due to the lighter and more flexible nature of the plastic material, the plastic bezel 206 may achieve similar rigidity as the metallic bezel 204. Since the plastic bezel 206 has little to no potential to create electromagnetic interference, it may be placed in close proximity to any antennas included within the associated computing device. This is also referred to herein as providing an electromagnetic window for the associated computing device.

The bottom bezel 208 is a metallic and/or plastic structure that forms a structure for mounting the keypad 210, the touchpad 212, and other electronic components (not shown) to the keyboard 200. The bottom bezel 208 may substantially span an entire bottom side (e.g., length and width) of the keyboard 200. In combination with the two-part top bezel 202, the bottom bezel 208 encapsulates the keypad 210, the touchpad 212, and other electronic components.

An overall maximum keyboard 200 thickness $t_1$ is predefined pursuant to product development specifications and the various components of the keyboard 200 (e.g., the two-part top bezel 202, the bottom bezel 208, the keypad 210, and the touchpad 212) may have different thicknesses. For example, the two-part top bezel 202 may have two distinct overall thicknesses $t_3$, $t_4$. Metallic bezel thickness $t_4$ is oriented in an area occupied by the keypad 210 (referred to herein as keypad area) so that the overall keyboard 200 thickness in the keypad area is maintained at or below the predefined overall maximum keyboard thickness $t_1$. Similarly, plastic bezel 206 thickness $t_3$ is oriented in an area extending along an edge of the keyboard 200 opposite the hinges (not shown, see e.g., hinge 118 of FIG. 1). Both the metallic bezel 204 and the plastic bezel 206 include an overlapping region 207 where the plastic bezel 206 is thinner to accommodate the thickness of the metallic bezel 204, as shown. The overlapping region 207 may also be occupied by the touchpad 212 (also referred to herein as palm rest area) so that the overall keyboard 200 thickness in the palm rest area is also maintained at or below the predefined overall maximum keyboard thickness $t_1$. Thus, the overall thickness of the keyboard 200 is maintained at or below the predefined overall maximum keyboard thickness across substantially the entire keyboard 200.

The keyboard 200 may possess an overall thickness $t_1$ between 3.0 mm and 4.0 mm. Of the overall thickness $t_1$, the bottom bezel 208 occupies bottom bezel thickness $t_2$, between 1.4 mm and 2.0 mm. The remaining thickness $t_3$, between 1.6 mm and 2.0 mm, is equal to the plastic bezel 206 thickness about the area extending along an edge of the keyboard 200 opposite the hinges and a combined metallic bezel 204 and plastic bezel 206 thickness in the palm rest area of the keyboard 200. The thickness $t_4$ of metallic bezel 204 in the area of the keypad 210 is between 0.9 mm and 1.1 mm. In some implementations, the plastic bezel 206 and tops of individual keys of the keypad 210 are substantially coplanar, as shown. In other implementations, the metallic bezel 204 and the plastic bezel 206 may be formed and attached to one another in a manner that creates a coplanar top surface (e.g., less than 0.1 mm difference in height) of the top bezel 202 in both the keypad area and the touchpad area of the keyboard 200. In various implementations, approximate dimensions as defined herein are +/−10%. In other implementations (e.g., large travel keysets or touch actuated keypads), overall thickness $t_1$ may lie between 1.0 mm and 5.0 mm and thicknesses $t_2$, $t_3$, and $t_4$ have proportionally smaller or greater values than that defined above. Other dimensions of the keyboard 200 are contemplated herein.

Figure 3:
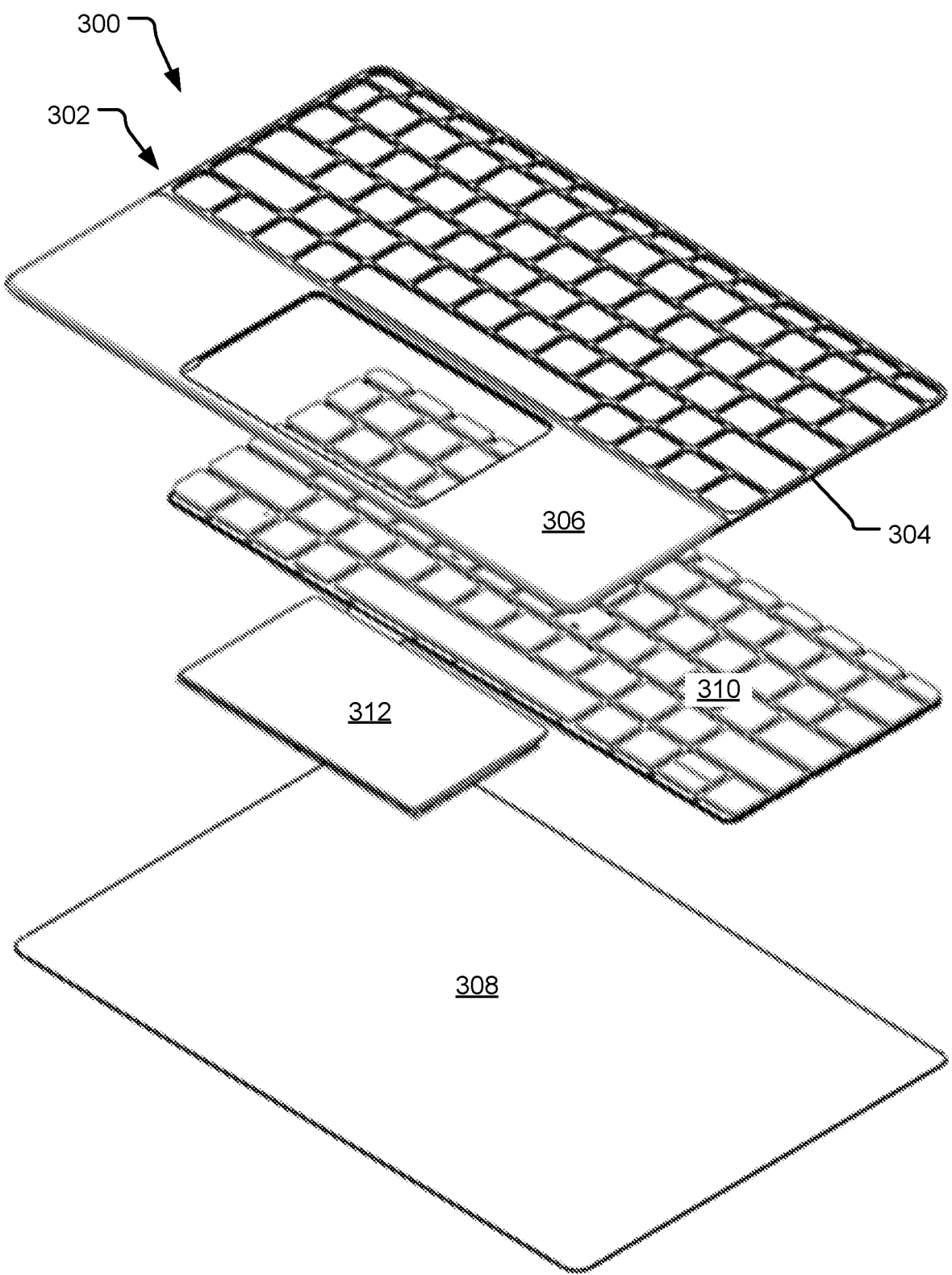
FIG. 3 illustrates an exploded top perspective view of an example metal and plastic composite keyboard.

FIG. 3 illustrates an exploded top perspective view of an example metal and plastic composite keyboard 300. The keyboard 300 includes a two-part top bezel 302, which is combined with a bottom bezel or backer 308 to form a structure for securing a keypad 310 and a touchpad 312 within the keyboard 300. The two-part top bezel 302 spans substantially an entire top surface area of the bottom bezel 308, thus substantially an entire top surface area of the keyboard 300. In further implementations, the top bezel 302 and the bottom bezel 308 may secure additional electronic components within the keyboard 300. The structure formed by the two-part top bezel 302 and the bottom bezel 308 may meet a predetermined stiffness requirement (e.g., meeting one or both of a bending stiffness specification and a typing stiffness specification) to hold deflection of the keyboard 300 within an acceptable range in response to a variety of projected loads (e.g., various bending and torsional loads). In an example implementation, the keyboard 300 may have a bending stiffness of 80N to 130N and a typing stiffness of 28N to 35N.

The two-part top bezel 302 forms a basis for mounting the keypad 310, the touchpad 312, and other electronic components (not shown) to the keyboard 300 and includes a metallic first top bezel 304 and a plastic second top bezel 306. The metallic bezel 304 and the plastic bezel 306 may be formed and attached to one another in a manner that creates a small step between keypad area and the touchpad area of the keyboard (e.g., a 0.5 mm to 1.5 mm difference in height in implementations including a fabric covering, less than 1.0 mm in uncovered implementations). The small step accommodates the keystroke of the individual keys of a keypad and prevents the individual keys from being depressed when an associated computing device in hinged to a closed position. In some implementations, the plastic bezel 306 is attached on top of a portion of the metallic bezel 304, thus creating a difference in height equal to a thickness of the plastic bezel 306.

The metallic bezel 304 is made of a generally stiffer and heavier material than the plastic bezel 306. However, the metallic bezel 304 has a potential to create electromagnetic interference. The metallic bezel 304 is used in areas of the keyboard 300 where there is little overall available top surface area. For example, the metallic bezel 304 is a grid or webbing that surrounds the keypad 310 and individual keys of the keypad 310 where the keypad 310 consumes much of the available surface area of the keyboard 300. Further, as the metallic bezel 304 has a potential to create electromagnetic interference when placed in close proximity to an antenna (not shown, see e.g., antenna 122 of FIG. 1), the metallic bezel 304 is kept within a physical location on the keyboard 300 away from any antennas included within an associated computing device (not shown, see e.g., computing device 101 of FIG. 1).

The plastic bezel 306 is made of a generally lighter and more flexible material than the metallic bezel 304. In contrast to the metallic bezel 304, the plastic bezel 306 has little to no potential to create electromagnetic interference. The plastic bezel 306 is used in areas of the keyboard 300 where there is greater available surface area for the plastic bezel 306. For example, the plastic bezel 306 forms a palm rest portion of the keyboard 300 and surrounds the touchpad 312. As there is greater available top surface area in the touchpad area of the keyboard 300 as compared to the keypad area, a greater quantity of plastic material may be used to form the plastic bezel 306 as compared to the metallic bezel 304. However, due to the lighter and more flexible nature of the plastic material, the plastic bezel 306 may achieve similar rigidity as the metallic bezel 304, particularly when stiffening ribbing (not shown, see e.g., stiffening region 434 of FIG. 4) is included in areas when space permits. Since the plastic bezel 306 has little to no potential to create electromagnetic interference, it may be placed in close proximity to any antennas included within the associated computing device.

The bottom bezel 308 is a metallic and/or plastic structure that covers a bottom-side of the keypad 310, the touchpad 312, and other electronic components (not shown) within the keyboard 300. In combination with the two-part top bezel 302, the bottom bezel 308 encapsulates the keypad 310, the touchpad 312, and other electronic components.

Figure 4:
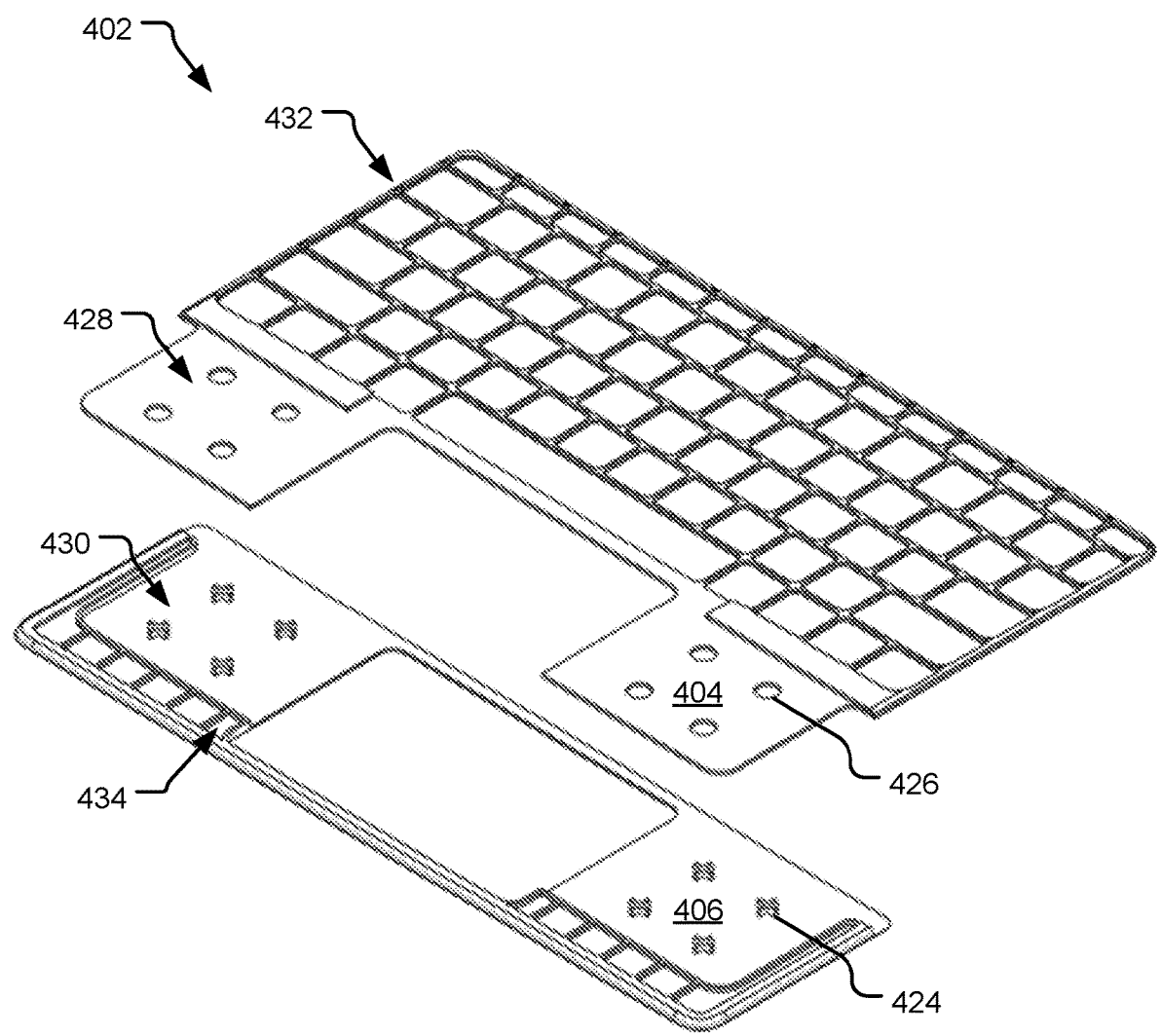
FIG. 4 illustrates an exploded bottom perspective view of an example two-part metal and plastic bezel for a composite keyboard.

FIG. 4 illustrates an exploded bottom perspective view of an example two-part metal and plastic top bezel 402 for a composite keyboard (not shown, see e.g., keyboard 300 of FIG. 3). The two-part top bezel 402 includes a metallic first top bezel 404 and a plastic second top bezel 406.

One or both of the metallic bezel 404 and the plastic bezel 406 may include one or more alignment and/or attachment aids (e.g., aids 424, 426), which align the metallic bezel 404 with the plastic bezel 406 during assembly and/or mechanically attach the metallic bezel 404 to the plastic bezel 406. For example, alignment aid 424 is a protrusion in a bottom surface of the plastic bezel 406 and alignment aid 426 is a corresponding aperture in the metallic bezel 404. The protrusion 424 is intended to align with the corresponding aperture 426 during assembly of the top bezel 402. The protrusion 424 may also have a friction fit or barbed features that engage with the aperture 426 when assembled and attaches the metallic bezel 404 to the plastic bezel 406. In addition to or in lieu of the aforementioned mechanical attachments, metallic bezel 404 may be heat staked, glued, welded, screwed, riveted, or otherwise attached to the plastic bezel 406.

The metallic bezel 404 is made of a generally stiffer and heavier material than the plastic bezel 406. However, the metallic bezel 404 has a potential to create electromagnetic interference. The metallic bezel 404 is used in areas of the keyboard where there is little overall available surface area. For example, the metallic bezel 404 is a grid or webbing 432 that surrounds a keypad and individual keys of the keypad where the keypad consumes much of the available surface area of the keyboard.

The metallic bezel 404 further includes overlapping regions (e.g., overlapping region 428) that contain the aforementioned alignment and attachment aids and serve as a surface for attaching the metallic bezel 404 to the plastic bezel 406. Further, as the metallic bezel 404 has a potential to create electromagnetic interference when placed in close proximity to an antenna (not shown, see e.g., antenna 122 of FIG. 1), the metallic bezel 404 is kept within a physical location on the keyboard away from any antennas included within an associated computing device (not shown, see e.g., computing device 101 of FIG. 1).

The plastic bezel 406 is made of a generally lighter and more flexible material than the metallic bezel 404. In contrast to the metallic bezel 404, the plastic bezel 406 has little to no potential to create electromagnetic interference. The plastic bezel 406 is used in areas of the keyboard where there is greater available top surface area for the plastic bezel 406. For example, the plastic bezel 406 forms a palm rest portion of the keyboard and surrounds the touchpad. Further, the plastic bezel 406 is used in areas of the keyboard that are likely to be in regular direct contact with a user. Due to the lower thermal conductivity of plastic as compared to metal, the plastic bezel 406 feels cooler to the user, which enhances the user experience.

The plastic bezel 406 also includes matching overlapping regions (e.g., overlapping region 430) that contain the aforementioned alignment and attachment aids and serve as a surface for attaching the plastic bezel 406 to the metallic bezel 404. The plastic bezel 406 further includes stiffening regions (e.g., stiffening region 434) that include one or both of a greater overall thickness and stiffening ribs or channels. For example, the stiffening region 434 is located in areas of the plastic bezel 306 that do not overlap with the metallic bezel 304. The thickness that is otherwise occupied by the metallic bezel 304 in the overlapping regions is occupied by a greater overall thickness and/or stiffening ribs or channels in the stiffening region 434.

As there is greater available top surface area in the touchpad area of the keyboard as compared to the keypad area, a greater quantity of plastic material may be used to form the plastic bezel 406 as compared to the metallic bezel 404. However, due to the lighter and more flexible nature of the plastic material, the plastic bezel 406 may achieve similar overall rigidity as the metallic bezel 404. Since the plastic bezel 406 has little to no potential to create electromagnetic interference, it may be placed in close proximity to any antennas included within the associated computing device.

Figure 5:
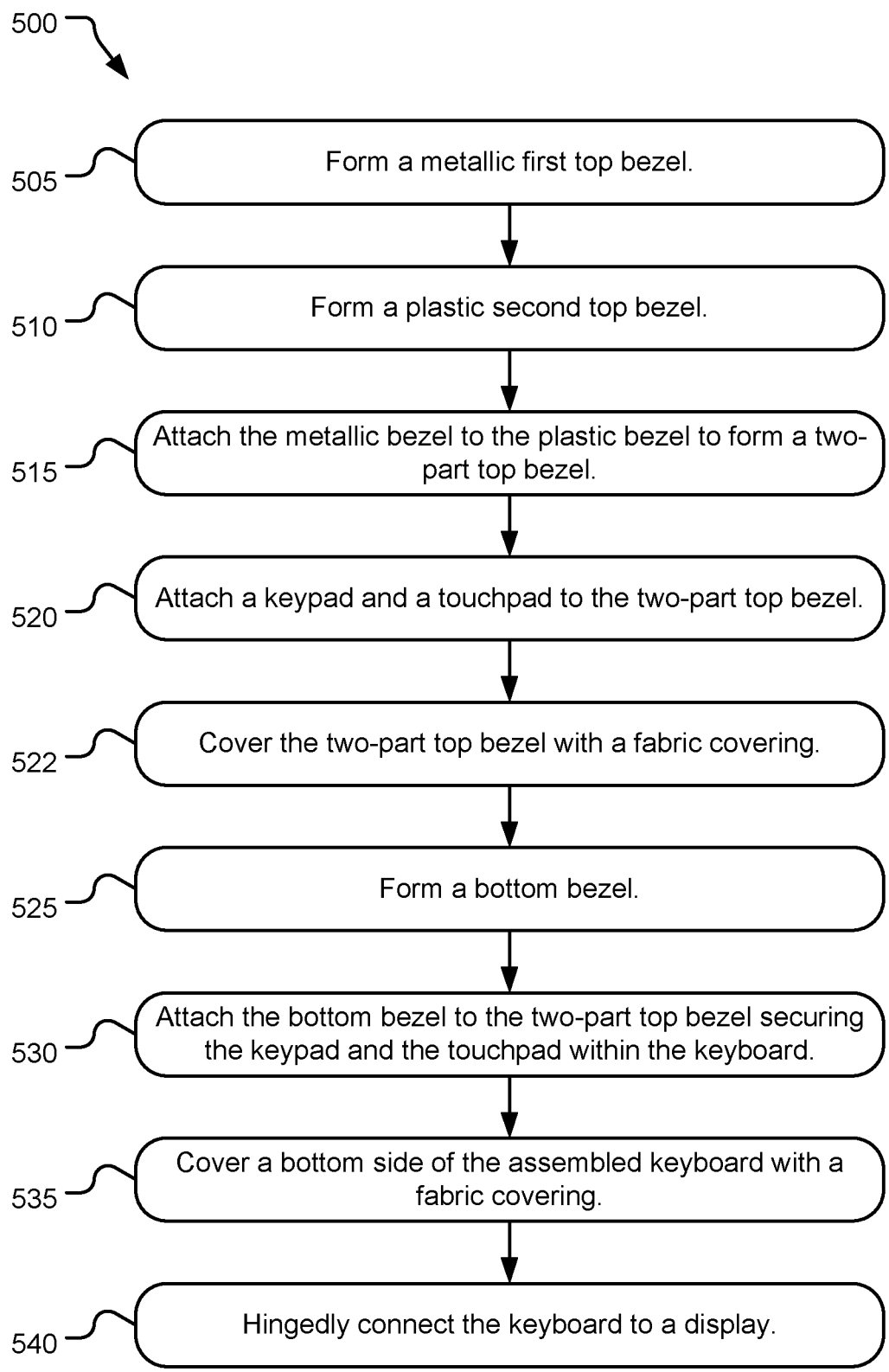
FIG. 5 illustrates example operations for manufacturing a metal and plastic composite keyboard.

FIG. 5 illustrates example operations 500 for manufacturing a metal and plastic composite keyboard. A first forming operation 505 forms a metallic first top bezel. The metallic bezel is a relatively thin structure including a webbing separating individual keys of a keypad for the keyboard and an overlapping region for attachment to a plastic second top bezel. The metallic bezel may be formed using any available manufacturing technique, including but not limited to cutting, burning, stamping, machining, casting, and welding.

A second forming operation 510 forms the plastic second top bezel. The plastic second top bezel is may be thicker and occupy for top surface area than the metallic bezel but may have a similar overall rigidity as the metallic bezel. The plastic bezel forms a palm rest of the keyboard and includes an overlapping region for attachment to the metallic bezel. The plastic bezel may also surround a touchpad of the keyboard and form an electromagnetic window extending along an edge of the keyboard. The plastic bezel may be formed using any available manufacturing technique, including but not limited to, molding, casting, and extruding.

A first attaching operation 515 attaches the metallic bezel to the plastic bezel to form a two-part top bezel. In one example implementation, matching protrusions and recesses are located within the overlapping regions of the metallic first top bezel and the plastic second top bezel, respectively, or vice versa. The protrusions may also have a friction fit or barbed feature that engages with the corresponding apertures when assembled, thereby attaching the metallic bezel to the plastic bezel. In addition to or in lieu of the aforementioned mechanical attachments, the metallic bezel may be heat staked, glued, welded, screwed, riveted, or otherwise attached to the plastic bezel.

A second attaching operation 520 attaches the keypad and the touchpad to the two-part top bezel. The top bezel provides a mounting structure and support for the keypad and the touchpad. In further implementations, the top bezel provides a mounting structure for additional electronic components of the keyboard. A first covering operation 522 covers the two-part top bezel with a fabric covering. The fabric covering may conceal seams between the metallic first top bezel and the plastic second top bezel.

A third forming operation 525 forms a bottom bezel. The bottom bezel spans a bottom side of the keyboard and may be made of plastic, metal, any combination thereof, or other materials and may provide additional structural support for the keyboard and components mounted therein. Further, the bottom bezel may be formed using any available manufacturing technique depending on the material construction of the bottom bezel.

A third attaching operation 530 attaches the bottom bezel to the two-part top bezel securing and enclosing the keypad and the touchpad within the keyboard. The third attaching operation 530 may utilize any available attachment mechanism, for example, friction fitting, snapping, heat staking, gluing, welding, screwing, and riveting. A second covering operation 535 covers a bottom side of the keyboard with a fabric covering. The fabric covering applied in operation 535 meets and attaches to the fabric covering applied in operation 522 at a seam. The entire fabric covering may conceal seams between the metallic first top bezel, the plastic second top bezel, and the back bezel, as well as offer a desirable tactile experience for a user.

A hingedly connecting operation 540 hingedly connects the keyboard to a display to form a computing device. The display may include one or more antenna extending along an edge of the display opposite the hinges. The antenna may come in close proximity to the keyboard when the display is pivoted against the keyboard. The electromagnetic window in the plastic second top bezel is oriented to be in close proximity to the antenna when the display is pivoted against the keyboard, thus allowing the antenna to continue to operate uninterrupted and without substantial interference from the keyboard in all orientations of the display with respect to the keyboard.

The operations making up the embodiments of the invention described herein are referred to variously as operations, steps, objects, or modules. Furthermore, the operations may be performed in any order, adding or omitting operations as desired, unless explicitly claimed otherwise or a specific order is inherently necessitated by the claim language.

An example keyboard according to the presently disclosed technology includes a keypad, a touchpad, a bottom bezel, a metallic first top bezel, and a plastic second top bezel. The bottom bezel provides structural support for the keypad and the touchpad and spans a bottom side of the keyboard. The metallic first top bezel includes webbing separating individual keys of the keypad and spans substantially an entire width of the bottom bezel in a keypad area of the keyboard. The plastic second top bezel forms a palm rest of the keyboard and spans substantially an entire width of the bottom bezel in a touchpad area of the keyboard.

In another example keyboard according to the presently disclosed technology, the plastic second top bezel surrounds the touchpad.

In another example keyboard according to the presently disclosed technology, the metallic first top bezel includes one or more alignment aids that interface with one or more corresponding alignment aids included in the plastic second top bezel.

In another example keyboard according to the presently disclosed technology, the alignment aids included in the metallic first top bezel are apertures and the alignment aids included in the plastic second top bezel are protrusions.

In another example keyboard according to the presently disclosed technology, the metallic first top bezel and the second plastic top bezel each includes an overlapping region where the metallic first top bezel is attached to the second plastic top bezel.

Another example keyboard according to the presently disclosed technology further includes one or more hinges to connect the keyboard to a display of a computing device.

In another example keyboard according to the presently disclosed technology, the display includes an antenna extending along an edge of the display opposite the hinges.

In another example keyboard according to the presently disclosed technology, the second plastic top bezel forms an electromagnetic window extending along an edge of the keyboard opposite the hinges.

Another example keyboard according to the presently disclosed technology further includes a fabric covering that encompasses the bottom bezel, the metallic first top bezel, and the plastic second top bezel, functions of the keypad and the touchpad passing through the fabric covering.

Another example keyboard according to the presently disclosed technology further includes a fabric covering that encompasses the bottom bezel, the metallic first top bezel, and the plastic second top bezel, the fabric covering including one or more windows that expose the keypad and the touchpad.

Another example keyboard according to the presently disclosed technology has an overall thickness less than 4 mm.

Another example keyboard according to the presently disclosed technology has a bending stiffness between 80N to 130N.

Another example keyboard according to the presently disclosed technology has a typing stiffness between 28N to 35N.

An example method of manufacturing a metal and plastic composite keyboard according to the presently disclosed technology includes forming a metallic first top bezel with webbing separating individual keys of a keypad and spanning substantially an entire width of the bottom bezel in a keypad area of the keyboard, forming a plastic second top bezel forming a palm rest of the keyboard and spanning substantially an entire width of the bottom bezel in a touchpad area of the keyboard, attaching the metallic first top bezel to the plastic second top bezel to form a two-part top bezel, and attaching the two-part top bezel to a bottom bezel. The bottom bezel provides structural support for the keypad and a touchpad and spans a bottom side of the keyboard.

Another example method of manufacturing a metal and plastic composite keyboard according to the presently disclosed technology includes attaching the keypad and the touchpad to the two-part top bezel. The keypad and the touchpad are secured between the two-part top bezel and the bottom bezel when the keyboard is fully assembled.

Another example method of manufacturing a metal and plastic composite keyboard according to the presently disclosed technology includes hingedly connecting the keyboard to a display. The display includes an antenna extending along an edge of the display opposite one or more hinges and the second plastic top bezel forms an electromagnetic window extending along an edge of the keyboard opposite the hinges.

Another example method of manufacturing a metal and plastic composite keyboard according to the presently disclosed technology includes covering the keyboard with a fabric covering.

In another example method of manufacturing a metal and plastic composite keyboard according to the presently disclosed technology, the metallic first top bezel is stamped and the plastic second top bezel is molded.

An example computing device according to the presently disclosed technology includes a first hinged portion including an antenna extending along an edge of the first hinged portion opposite a hinge and a second hinged portion including a keyboard. The keyboard includes a keypad, a touchpad, a bottom bezel providing structural support for the keypad and the touchpad and spanning a bottom side of the keyboard, a metallic first top bezel with webbing separating individual keys of the keypad and spanning substantially an entire width of the bottom bezel in a keypad area of the keyboard, and a plastic second top bezel forming a palm rest of the keyboard and spanning substantially an entire width of the bottom bezel in a touchpad area of the keyboard. The plastic second top bezel forms an electromagnetic window extending along an edge of the keyboard opposite the hinge when the second hinged portion is pivoted against the first hinged portion.

In another example computing device according to the presently disclosed technology, the first hinged portion is detachable from the second hinged portion.

The above specification, examples, and data provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet another embodiment without departing from the recited claims.

What is claimed is:

1. A keyboard comprising:
   a keypad;
   a touchpad;
   an exterior-facing bottom bezel providing structural support for the keypad and the touchpad and forming a bottom surface of the keyboard that spans a bottom side of the keyboard;
   an exterior-facing metallic first top bezel with webbing separating individual keys of the keypad, the first top bezel forming a top surface of the keyboard and spanning substantially an entire width of the bottom bezel in a keypad area of the keyboard; and
   an exterior-facing plastic second top bezel forming a top surface and palm rest of the keyboard, the second top bezel spanning substantially an entire width of the bottom bezel in a touchpad area of the keyboard without extending into the keypad area of the keyboard, wherein the bottom bezel, the first top bezel, and the second top bezel in combination are arranged around the keypad and the touchpad to secure the keypad and the touchpad within the keyboard.

2. The keyboard of claim 1, wherein the plastic second top bezel surrounds the touchpad.

3. The keyboard of claim 1, wherein the metallic first top bezel includes one or more alignment aids that interface with one or more corresponding alignment aids included in the plastic second top bezel.

4. The keyboard of claim 3, wherein the alignment aids included in the metallic first top bezel are apertures and the alignment aids included in the plastic second top bezel are protrusions.

5. The keyboard of claim 1, wherein the metallic first top bezel and the second plastic top bezel each includes an overlapping region where the metallic first top bezel is attached to the second plastic top bezel.

6. The keyboard of claim 1, further comprising:
   one or more hinges to connect the keyboard to a display of a computing device.

7. The keyboard of claim 6, wherein the display includes an antenna extending along an edge of the display opposite the hinges.

8. The keyboard of claim 6, wherein the second plastic top bezel forms an electromagnetic window extending along an edge of the keyboard opposite the hinges.

9. The keyboard of claim 1, further comprising:
   a fabric covering that encompasses the bottom bezel, the metallic first top bezel, and the plastic second top bezel, functions of the keypad and the touchpad passing through the fabric covering.

10. The keyboard of claim 1, further comprising:
    a fabric covering that encompasses the bottom bezel, the metallic first top bezel, and the plastic second top bezel, the fabric covering including one or more windows that expose the keypad and the touchpad.

11. The keyboard of claim 1 having an overall thickness less than 4 mm.

12. The keyboard of claim 1 having a bending stiffness between 80N to 130N.

13. The keyboard of claim 1 having a typing stiffness between 28N to 35N.

14. A method of manufacturing a metal and plastic composite keyboard comprising:
    forming a metallic first top bezel with webbing separating individual keys of a keypad and spanning substantially an entire width of the bottom bezel in a keypad area of the keyboard;
    forming a plastic second top bezel forming a palm rest of the keyboard and spanning substantially an entire width of the bottom bezel in a touchpad area of the keyboard without extending into the keypad area of the keyboard;

attaching the metallic first top bezel to the plastic second top bezel to form a two-part top bezel, wherein the metallic first top bezel and the plastic second top bezel are each exterior-facing and in combination form a top surface of the keyboard; and attaching the two-part top bezel to an exterior-facing bottom bezel, the bottom bezel providing structural support for the keypad and a touchpad and forming a bottom surface of the keyboard that spans a bottom side of the keyboard, wherein the bottom bezel, the first top bezel, and the second top bezel in combination are arranged around the keypad and the touchpad to secure the keypad and the touchpad within the keyboard.

15. The method of claim 14, further comprising:

attaching the keypad and the touchpad to the two-part top bezel, wherein the keypad and the touchpad are secured between the two-part top bezel and the bottom bezel when the keyboard is fully assembled.

16. The method of claim 14, further comprising:

hingedly connecting the keyboard to a display, wherein the display includes an antenna extending along an edge of the display opposite one or more hinges and the second plastic top bezel forms an electromagnetic window extending along an edge of the keyboard opposite the hinges.

17. The method of claim 14, further comprising:

covering the keyboard with a fabric covering.

18. The method of claim 14, wherein the metallic first top bezel is stamped and the plastic second top bezel is molded.

19. A computing device comprising:
a first hinged portion including an antenna extending along an edge of the first hinged portion opposite a hinge; and
a second hinged portion including a keyboard, the keyboard including:
a keypad;
a touchpad;
an exterior-facing bottom bezel providing structural support for the keypad and the touchpad and forming a bottom surface of the keyboard that spans a bottom side of the keyboard;
an exterior-facing metallic first top bezel with webbing separating individual keys of the keypad, the first top bezel forming a top surface of the keyboard and spanning substantially an entire width of the bottom bezel in a keypad area of the keyboard; and
an exterior-facing plastic second top bezel forming a top surface and palm rest of the keyboard, the second top bezel spanning substantially an entire width of the bottom bezel in a touchpad area of the keyboard without extending into the keypad area of the keyboard, wherein the plastic second top bezel forms an electromagnetic window extending along an edge of the keyboard opposite the hinge when the second hinged portion is pivoted against the first hinged portion, and wherein the bottom bezel, the first top bezel, and the second top bezel in combination are arranged around the keypad and the touchpad to secure the keypad and the touchpad within the keyboard.

20. The computing device of claim 19, wherein the first hinged portion is detachable from the second hinged portion.

* * * * *